United States Patent [19]

Franken et al.

[11] Patent Number: 5,054,714
[45] Date of Patent: Oct. 8, 1991

[54] AIRCRAFT TRACTOR WITHOUT TOW-BAR WITH ADJUSTABLE TOW ARMS

[75] Inventors: Wilhelm Franken, Wesel; Dieter Pohé, Gelsenkirchen; Lars T. Michaelsen, Herdecke, all of Fed. Rep. of Germany

[73] Assignee: Man Gutehoffnungshütte Aktiengesellschaft

[21] Appl. No.: 515,117

[22] Filed: Apr. 27, 1990

[30] Foreign Application Priority Data

Apr. 28, 1989 [DE] Fed. Rep. of Germany ..... 89107731

[51] Int. Cl.[5] ............................................ B64C 25/50
[52] U.S. Cl. .................................... 244/50; 180/14.7; 180/904; 414/426; 414/429
[58] Field of Search ................. 244/50; 180/14.7, 904; 414/426–430

[56] References Cited

U.S. PATENT DOCUMENTS

| 4,375,244 | 3/1983 | Morin | 180/14.7 |
| 4,658,924 | 4/1987 | Dobbie | 180/904 |
| 4,810,157 | 3/1989 | Schopf | 414/429 |
| 4,950,121 | 8/1990 | Meyer et al. | 414/428 |

FOREIGN PATENT DOCUMENTS

| 0284836 | 10/1988 | European Pat. Off. | 244/50 |
| 0309761 | 4/1989 | European Pat. Off. | 180/904 |
| 0331363 | 9/1989 | European Pat. Off. | 244/50 |
| 8908583 | 9/1989 | PCT Int'l Appl. | 414/426 |

Primary Examiner—Joseph F. Peters, Jr.
Assistant Examiner—Christopher P. Ellis
Attorney, Agent, or Firm—McGlew & Tuttle

[57] ABSTRACT

The aircraft tractor arrangement maintains a uniform degree of reliability with which the nose wheel landing gear, which is standing on a lifting platform that is arranged on the front part and extends into a recess (26), is held down on the surface of the lifting platform which supports the nose wheel landing gear at different nose wheel diameters.

Each telescoping rod (30) is hinged (40, 44, 46) to the front part (10.1) directly in the front. A connecting hydraulic cylinder (42) is provided in the rear. The hydraulic cylinder (46) for longitudinal adjustment, and also the hydraulic cylinder (36) for moving the holder (34) on the fixed part (30.1) of the telescoping rod (30) associated with it are arranged ridgedly.

This arrangement allows an adjustability in height of the two rear tow arms and at the same time of the front holders, which can come into contact with the two desired zones of the wheel circumference, regardless of the nose wheel diameter. The distance between the arms and the holders is adjustable.

4 Claims, 6 Drawing Sheets

AIRCRAFT TRACTOR WITHOUT TOW-BAR WITH ADJUSTABLE TOW ARMS

FIELD AND BACKGROUND OF THE INVENTION

The present invention pertains to an aircraft tractor without tow-bar, comprising a chassis, which may be divided, and whose front wheel axles are mounted on a front part and whose rear wheel axle stubs are mounted on a rear part. The rear part is forked by a recess for receiving the aircraft's nose wheel landing gear. The rear part is hinged to the front part, if desired, by means of an articulated axle which is parallel to the rear axle. On the front part a lifting paddle is arranged at the front end of the chassis recess, possibly behind the articulated axle, and the lifting paddle has a support surface for lifting the nose wheel landing gear up. The support surface slopes in the rearward and downward direction when the chassis is folded and is horizontal when the chassis is extended. Two mirror-image tow arms are arranged at the rear end of the chassis recess. These tow arms can be moved both from a transverse position for reaching behind each a nose wheel, into a longitudinal position before the nose wheel is picked up into the recess. The tow arms can also move in the forward direction by means of a telescoping rod which is provided with a first hydraulic cylinder-piston unit for adjusting its length. There is at least one nose wheel holder, which is arranged at the front end of the chassis recess, above the lifting paddle. The nose wheel holder can be moved in the rearward direction by means of a third cylinder-piston unit. The lifting device is freely selectable.

In a tractor of this class, which is known from DE-OS/PS 36,16,807, the immobile parts of the two telescoping rods are rigidly attached to the front part of the chassis. The cylinders of the first units, which are located below the associated telescoping rod, are fastened at their ends to the fixed parts of the telescoping rods. The cylinders of the third units are correspondingly attached horizontally to the front part of the chassis.

The disadvantage of this arrangement of the first and third units (to which the second cylinder-piston units for folding and extending the chassis are added), which move the tow arms forward and backward for exerting a counterpressure on the nose wheels in the longitudinal direction of the tractor, is the fact that these four arms, which are designed as roller blocks, are always at a constant height above the support surface of the lifting paddle that is rigidly connected to the front part of the chassis and are consequently closer to each other in pairs in the case of smaller nose wheel diameter and touch the nose wheel associated with them at a point closer to its upper vertex than in the case of a greater nose wheel diameter, which reaches its maximum when the tow arms, on one hand, and the holding arms, on the other hand, are diametrically opposite to one another relative to an approximately horizontal wheel diameter. In the case of an even greater wheel diameter, the grasping and holding arms would come into contact on the lower halves of the wheel, so that they would no longer be able to act as devices for holding down the nose wheels relative to the support surface of the lifting paddle. Consequently, in the prior-art tractor, the nose wheel diameter of the landing gear standing on the lifting paddle determines the degree of reliability with which the nose wheel landing gear of the aircraft to be towed is held down on the support surface.

SUMMARY AND OBJECT OF THE INVENTION

Therefore, the basic task of the present invention is to provide a tractor in which the above-mentioned degree of reliability can be maintained at a uniform level at different nose wheel diameters.

This task is accomplished according to the present invention in a tractor of the class described in the introduction in that each telescoping rod supporting a first unit is hinged to the front part of the chassis directly around axes that are parallel to the articulated axle directly in the front and by means of a fifth cylinder-piston unit as a connecting rod in the rear. The extension of this unit raises the tow arm hinged to the rear end of the telescoping rod. Each cylinder of a third unit is rigidly connected to part of one of the two telescoping rods, which part is immobile in the longitudinal direction. Every third unit with the telescoping rod associated with it can be pivoted around its front hinge axis. It is thus advantageously achieved that the two tow arms and the holder or holders (holding arms) can be brought simultaneously to the desired height above the support surface of the lifting paddle, in which the supported nose wheels are securely grasped by the arms and are held down on the lifting paddle. Each nose wheel can now be grasped at the desired two points of the upper half of its circumference regardless of its diameter and fixed between the telescoping rods, on one hand, and the front part of the chassis, on the other hand, by means of the connecting rods.

In a preferred embodiment of the tractor according to the present invention, the third units for moving the holder act on the ends of a bridge which crosses the chassis recess and indirectly supports the holder, and the ends of this bridge are mounted displaceably on parts of the two telescoping rods, which parts are immobile in their parallel longitudinal directions. This bridge permits uniform action of the piston rods of every third unit on the holder or on two holders of one nose wheel each for pushing the tractor off from the nose wheel landing gear, and also nonrigid support of each holder, which is advantageous in the case of the curving movement of the tractor with an inclined nose wheel landing gear.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DETAILED DESCRIPTION OF THE PREFERRED EMBODIMENT

Figure 1:
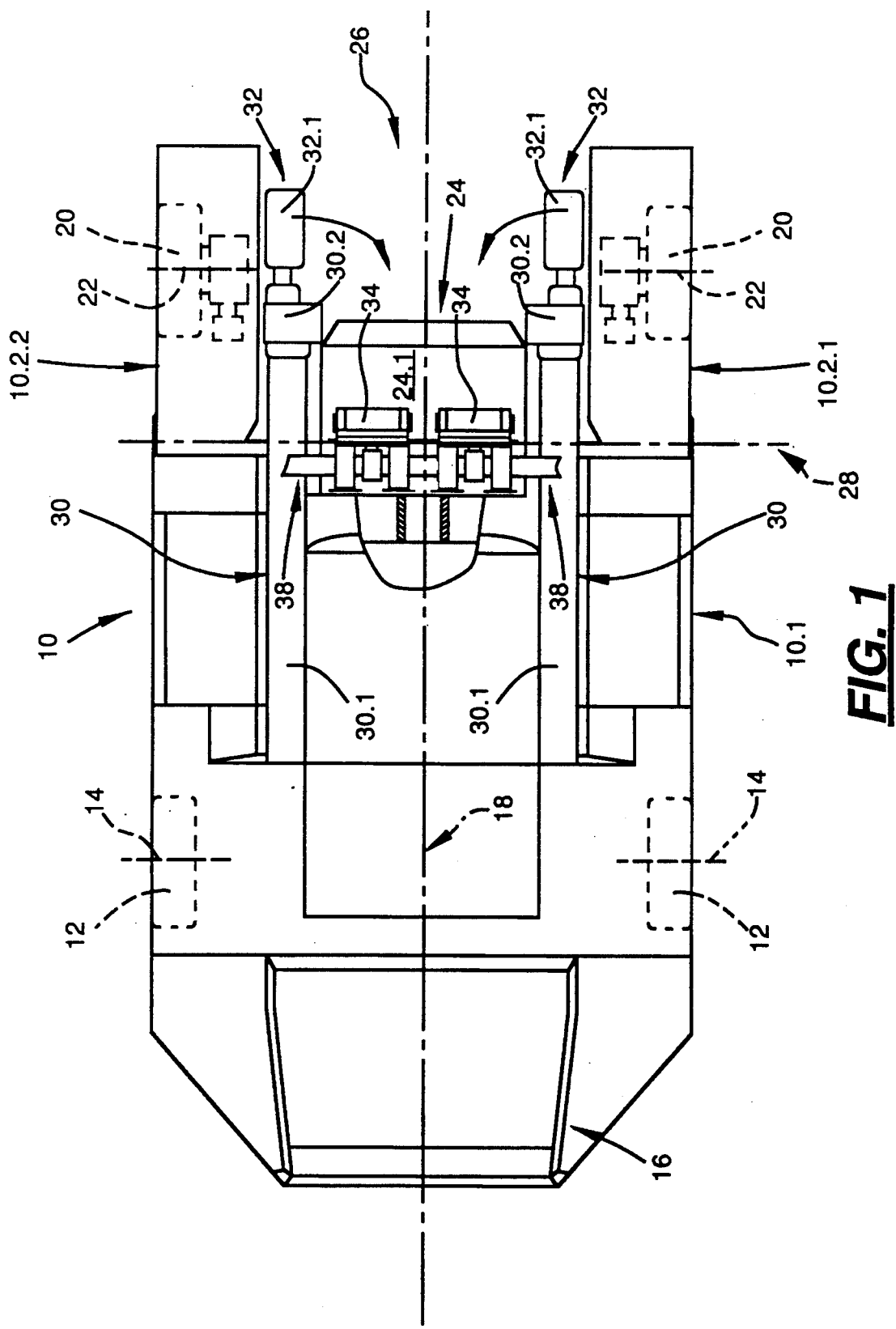
FIG. 1 is a top view of a preferred embodiment of the tractor construction according to the invention with tow arms in a longitudinal position.

In the embodiment shown, the tractor according to the present invention has a generally two-part chassis 10, on whose larger, uniform front part 10.1 two driven, steerable front wheels 12 with horizontal axes of rotation 14 are mounted, and a cabin 16 for the tractor operator is located in front of these front wheels. The rear part 10.2 of the chassis consists of a left half 10.2.1 and a right half 10.2.2, which are of equal design but mirror- image relative to a vertical symmetry plane containing the central horizontal longitudinal axis 18 of the tractor, which symmetry plane is perpendicular to a flat, imaginary road surface of the tractor. Each half of the chassis rear part 10.2 has a drivable rear wheel 20 which rotates with the opposite, second rear wheel around the same imaginary horizontal transverse axis 22. This axis 22 is perpendicular to the vertical symmetry plane containing the longitudinal axis 18 and is embodied by two rear wheel axle journals (not shown).

At the rear end of the chassis front part 10.1 there is a platform-like lifting paddle 24. The lifting paddle 24 is nearly in contact with the road surface during rotation of the chassis front part 10.1 around the axes of rotation 14 of the front wheels 12. The axes 14 are aligned in the straight position of the front wheels. The rear end of the chassis front part is separated from the lifting paddle when the nose wheels of the landing gear of the aircraft to be towed roll onto the lifting paddle 24. To achieve this, the symmetrical lifting paddle 24 has an inclined support surface 24.1 with a gradient in the rearward direction. The support surface 24.1 is horizontal in the extended position of the chassis 10 and takes up the nose wheel landing gear. The two halves 10.2.1 and 10.2.2 of the chassis rear part define a recess 26 of this rear part, which is open to the rear as well as at the top and bottom.

The front part 10.1 and the rear part 10.2 of the chassis are hinged together so that the chassis 10 can be folded to the road surface to lower the lifting paddle 24 and extended to raise the nose wheel landing gear standing on it. The horizontal articulated axle 28 crosses the longitudinal axis 18 of the tractor at right angles, approximately at the level of the lifting paddle support surface 24.1. The horizontal articulated axle 28 is arranged at the front end of the lifting paddle 24.

Figure 2:
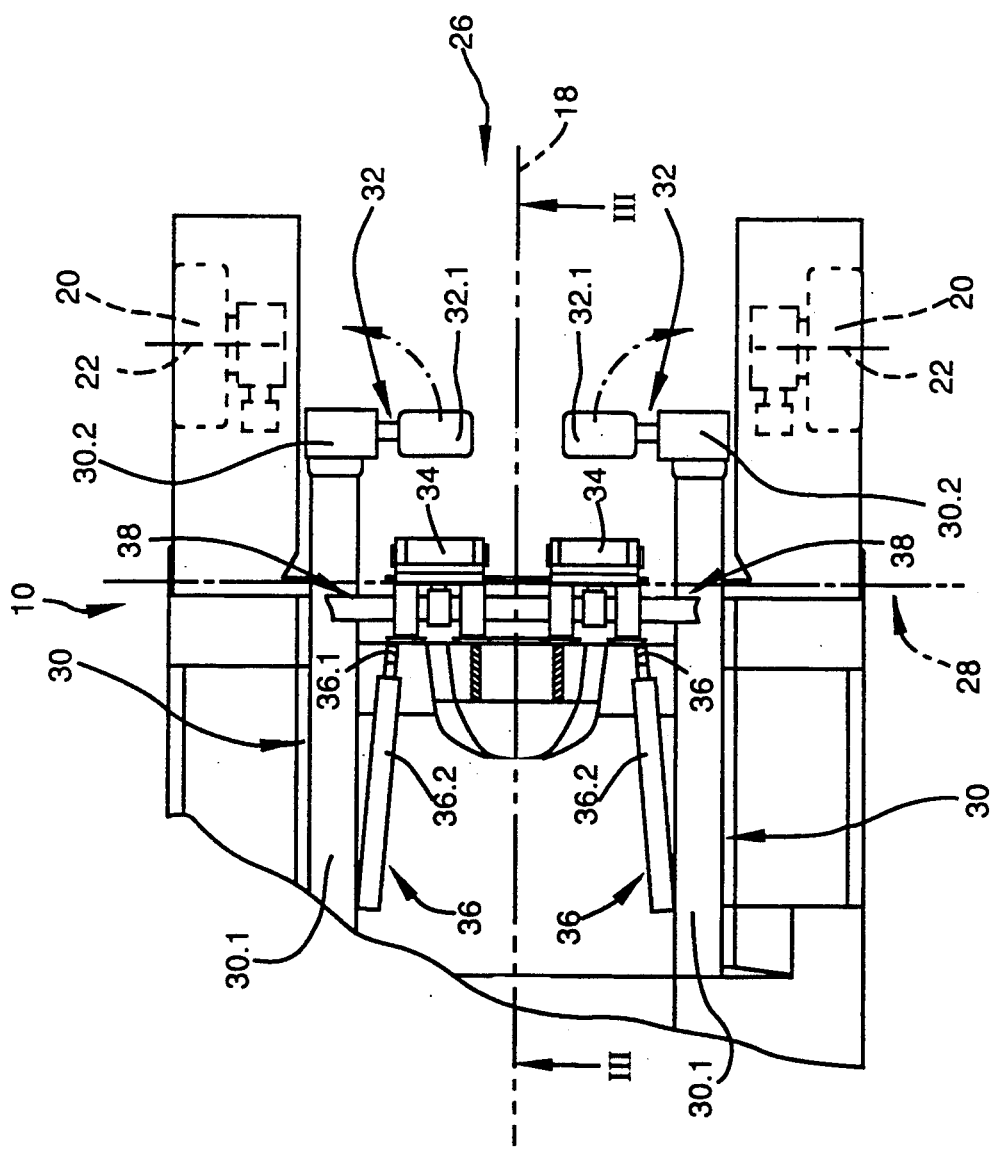
FIG. 2 is a broken-off top view of the embodiment with the tow arms in the transverse position.
Figure 3:
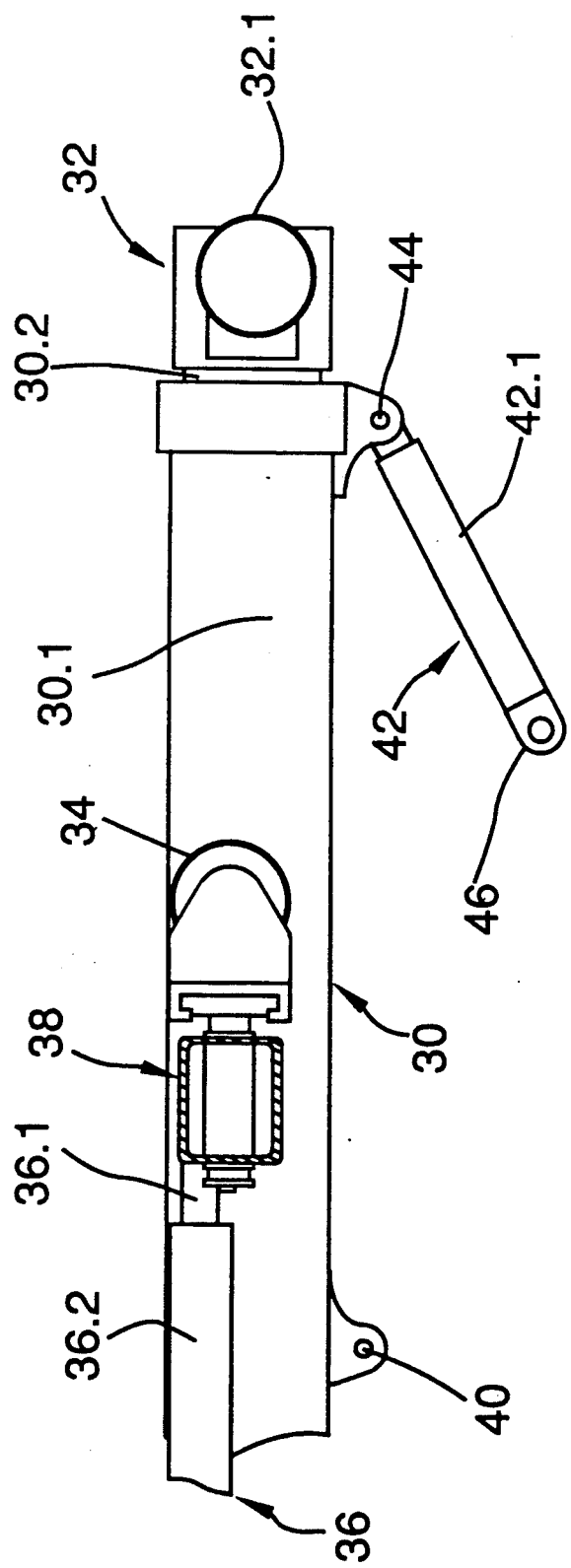
FIG. 3 is a central vertical longitudinal sectional view along line III—III in FIG. 2.
Figure 4:
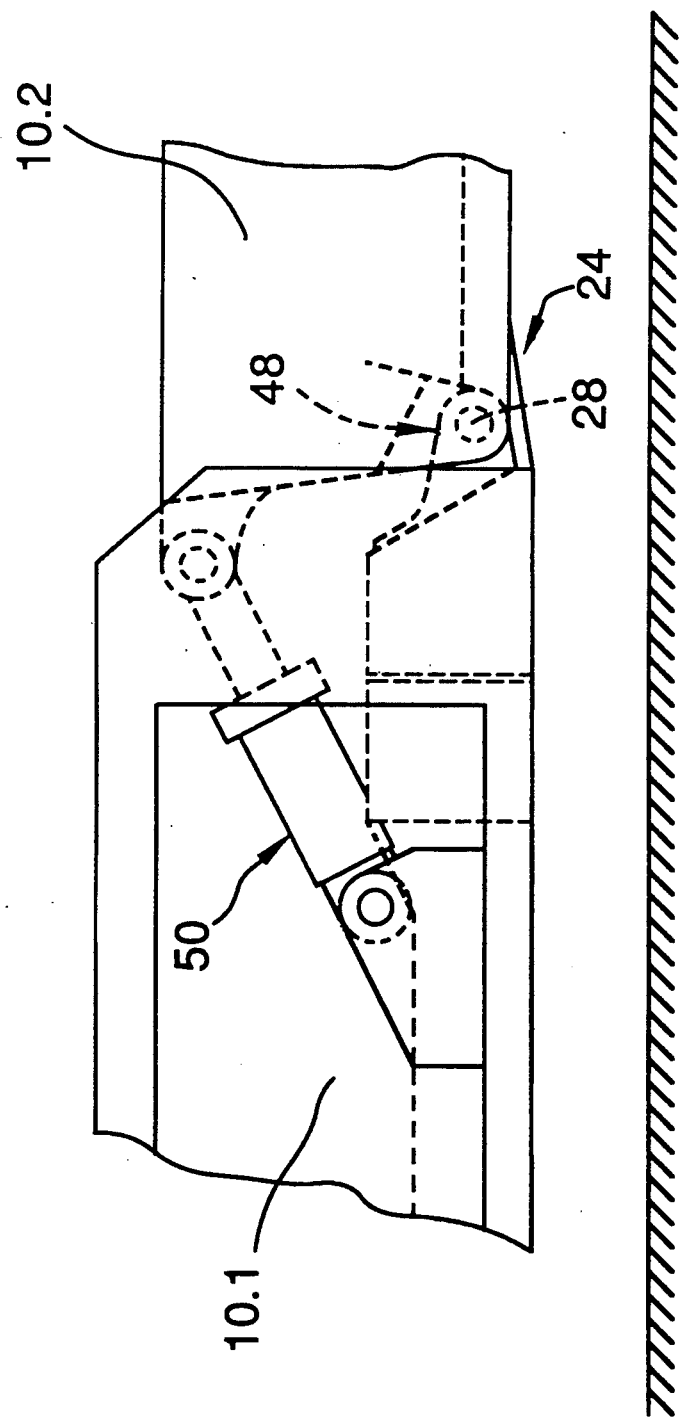
FIGS. 4 and 5 are a side view and a top view, respectively, of the articulation point of the chassis.
Figure 5:
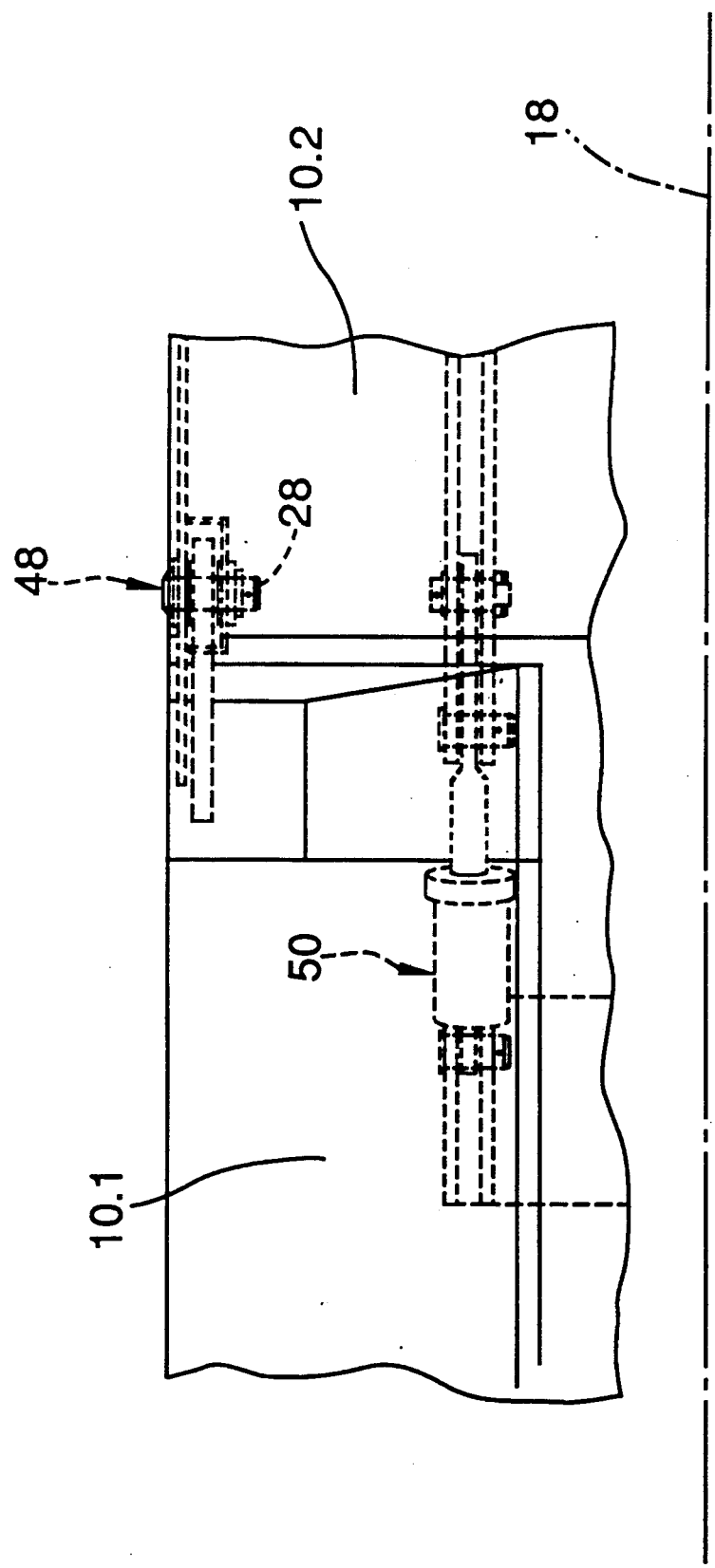
Figure 6:
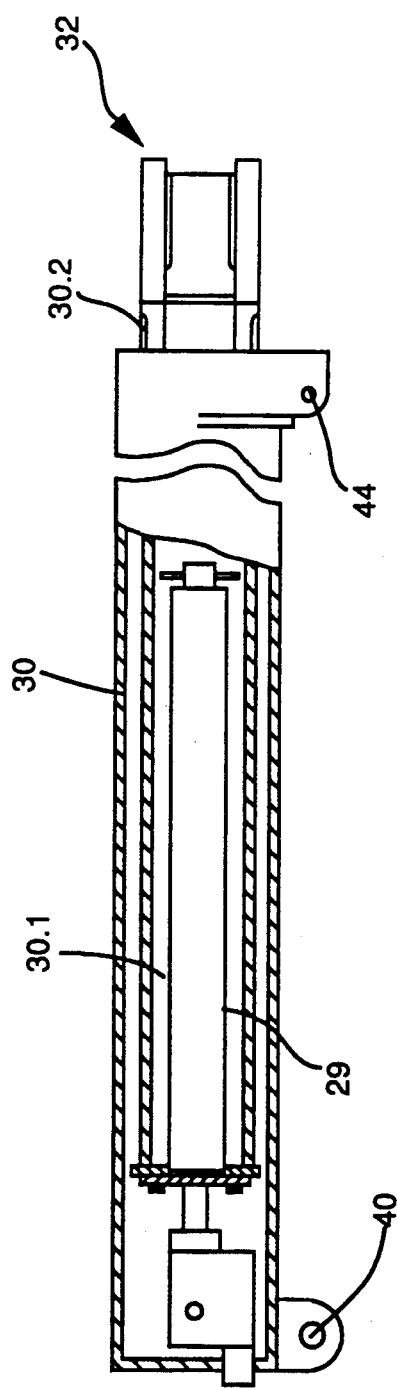
FIG. 6 is a broken-off side view of a telescoping rod.

One telescoping rod 30 is located between the lifting paddle 24 and each of the two halves of the chassis rear part 10.2. Each telescoping rod is provided with a first cylinder-piston unit 29 (see FIG. 6) for longitudinal adjustment. The fixed part 30.1 of the telescoping rod, i.e., the part that is not displaceable here, guides axially the associated movable part 30.2. The rear free end of the movable part 30.2 is hingedly connected to a tow arm 32 reaching behind a wheel of the nose wheel landing gear. The tow arm 32 can be pivoted around an approximately vertical axis intersecting the rod axis perpendicularly. The tow arm 32 pivots between a longitudinal position shown in FIG. 1 in parallel to the adjacent half of the chassis rear part 10.2, and a transverse position shown in FIG. 2, which is at right angles to the longitudinal position, in the directions of the arrows. In their longitudinal positions, the two tow arms 32 are ready to accept the nose wheel landing gear in the chassis recess 26. Two identical, symmetrically arranged nose wheel holders 34 are arranged at the front end of the chassis recess 26, and the nose wheel holders can be moved simultaneously in the rearward direction by means of two mirror-image, third cylinder-piston units 36 in order to push said nose wheel landing gear out the recess when the aircraft has been towed to the desired position. To achieve this, the two holders 34 are mounted directly on a bridge 38 which crosses the front end of the chassis recess 26 at right angles to the chassis longitudinal axis 18 above the lifting paddle 24. The two free ends of the holders 34 are in turn mounted on the two fixed telescoping rod parts 30.1 so that a relative displacement of the bridge 38 from the front to the rear and vice versa is possible by means of the two synchronously operating units 36. The piston rods 36.1 of the two synchronously operating units 36 are connected to the bridge and have cylinders 36.2 which are connected rigidly to the associated fixed part 30.1 of one of the two telescoping rods 30. The first units for longitudinal adjustment (not shown) are arranged on the telescoping rods 30 so that the two first units are always displaced with the two telescoping rods 30. Each of the two telescoping rods 30 is hinged directly to the chassis front part 10.1 in the front by means of a hinge 40 and indirectly, via a fifth cylinder-piston unit 42 in the rear. The cylinder 42.1 of this cylinder-piston unit 42 is connected to the rear end of the fixed telescoping rod part 30.1. The piston rod 42.2 of the unit 42 is connected via another hinge 46 to the chassis front part 10.1. The arrangement of the two units 42 in parallel vertical planes, between which the longitudinal axis 18 of the tractor extends as a midline, has been selected so that the two hinges 46 are located lower and in front of the two hinges 44. By this arrangement a shortening or extension of the two units 42 leads to the two telescoping rods 30 pivoting down and up, respectively. This occurs together with the two tow arms 32, so that in their transverse positions, the two tow arms 32 can always be arranged, regardless of the diameter of the nose wheels, at a starting height at which action of the two transverse tow arms 32, which is brought about by shortening of the two telescoping rods 30, on the nose wheels from the top and from behind is ensured. Consequently, the point of action on the circumference of the tire can always be selected in the upper rear one-fourth of the circumference. In order to reduce the relative movement, of each transverse tow arm 32 relative to the tire circumference, which occurs during shortening of the two telescoping rods 30, to a rolling friction, each tow arm 32 has a hollow roller 32.1 rolling on the nose wheel associated with it, which roller reaches behind the wheel.

Since the two nose wheel holders 34 are connected to the telescoping rods 30 via the bridge 38 supporting them, the holders are also lowered or raised during the swiveling of these holders, even though this swiveling movement is smaller than that of the tow arms (32), i.e., the point of mutual contact between the holder and the nose wheel is also selectable and it should be located in the upper front one-fourth of the circumference of the wheel. Correspondingly, the holders 34 also have a rotatable, circular cylindrical circumferential surface rolling on the nose wheel.

The front part 10.1 and the rear part 10.2 of the chassis are hinged together due to the fact that the left half 10.2.1 and the right half 10.2.2 of the chassis rear part form a swivel joint 48 each, whose pins are aligned and define the articulated axle 28.

To fold and extend the chassis 10 while lowering and raising the articulated axle 28, a pair of second hydraulic cylinder-piston units 50 are provided, which extend on both sides of the chassis front part 10.1 and are hinged to this front part in the front and to the chassis rear part 10.2 in the rear, so that the upper second units 50 act there approximately above the articulated axle 28.

What is claimed is:

1. An aircraft tractor without tow-bar comprising: a divided chassis having both a front part and a rear part hinged together by means of a single articulated axle; a front wheel axle mounted on said front part; a rear wheel axle mounted on said rear part, said rear wheel axle being substantially parallel to said articulated axle; a recess defined by said rear part, for receiving an aircraft nose wheel landing gear; a lifting paddle connected to said front part and extending into a front end of said recess, said lifting paddle giving support for lifting said aircraft nose wheel landing gear; first and second tow arms connected to said divided chassis extending to a rear end of said recess, one of each said tow arms being provided on each side of each recess, said tow arms being moveable to receive the aircraft nose wheel entering said recess, and being movable into a position behind the nose wheel where it can also move longitudinally and vertically into a plurality of non-linear positions, optimally securing the nose wheel in place; a hollow roller positioned around an end of each of said tow arms adjacent a location where each of said tow arms contacts said aircraft nose wheel; at least one nose wheel holder positioned at the front of said recess above said lifting paddle, said at least one nose wheel holder being simultaneously moveable in a vertical and longitudinal direction to position said at least one nose wheel holder in a plurality of non-linear positions; a hollow roller around said nose wheel holder at a location where said nose wheel holder contacts said aircraft nose wheel.

2. An aircraft tractor without tow-bar comprising: a chassis whose rear part defines a recess for receiving an aircraft nose wheel landing gear; a lifting paddle connected to the chassis extending into the front end of said recess; said lifting paddle giving support for lifting said aircraft nose wheel landing gear; first and second tow arms connected to said chassis extending to a rear end of said recess, one of each said tow arms being provided on each side of said recess, said tow arms being moveable to receive the aircraft nose wheel entering said recess and being movable into a position behind the nose wheel, said tow arms being moveable in both longitudinal and vertical directions into a plurality of non-linear positions, optimally securing the nose wheel in place; a hollow roller positioned around an end of each of said tow arms adjacent a location where each of said tow arms contacts said aircraft nose wheel; at least one nose wheel holder positioned at the front of said recess above said lifting panel, said at least one nose wheel holder being simultaneously moveable in a vertical and longitudinal direction to a plurality of non-linear positions; a hollow roller positioned around said nose wheel holder at a location where said nose wheel holder contacts the aircraft nose wheel.

3. An aircraft tractor in accordance with claim 2, further comprising:
a first telescoping rod having a first end pivotally attached to said chassis and a second end attached to said first tow arm;
a second telescoping rod having a first end pivotably attached to said chassis and a second end attached to said second tow arm, said telescoping rods moving said tow arms into said plurality of non-linear positions by extension movements of said telescoping rods and by pivoting movements of said telescoping rods about said first end.

4. An aircraft tractor in accordance with claim 3, further comprising:
a rear cylinder-piston unit having a first end attached to said chassis and having a second end attached to said second end of one of said telescoping rods for pivoting said one of said telescoping rods.

* * * * *